US009857026B1

(12) United States Patent
Hoberman

(10) Patent No.: US 9,857,026 B1
(45) Date of Patent: Jan. 2, 2018

(54) CONSTRUCTION METHOD FOR FOLDABLE UNITS

(71) Applicant: Charles Hoberman, New York, NY (US)

(72) Inventor: Charles Hoberman, New York, NY (US)

( * ) Notice: Subject to any disclaimer, the term of this patent is extended or adjusted under 35 U.S.C. 154(b) by 0 days.

(21) Appl. No.: 14/796,288

(22) Filed: Jul. 10, 2015

Related U.S. Application Data

(60) Provisional application No. 62/023,240, filed on Jul. 11, 2014.

(51) Int. Cl.
*E04B 7/02* (2006.01)
*E04B 7/10* (2006.01)
*F16S 1/08* (2006.01)
*F16S 1/10* (2006.01)
*E04B 1/19* (2006.01)
*E04B 1/343* (2006.01)

(52) U.S. Cl.
CPC . *F16S 1/08* (2013.01); *F16S 1/10* (2013.01); *E04B 1/34357* (2013.01); *E04B 7/10* (2013.01); *E04B 7/107* (2013.01); *E04B 2001/1918* (2013.01)

(58) Field of Classification Search
USPC ............ 52/81.1, 81.3, 81.5, 81.4, 81.6, 80.1
See application file for complete search history.

(56) References Cited

U.S. PATENT DOCUMENTS

| | | | | |
|---|---|---|---|---|
| 4,145,850 A | * | 3/1979 | Runyon | E04B 31/32 52/71 |
| 4,314,636 A | * | 2/1982 | Slysh | E04H 12/182 206/321 |
| 4,498,800 A | * | 2/1985 | Sielaff | E04B 31/1903 403/172 |
| 4,521,998 A | * | 6/1985 | DeLorme | E04B 1/1903 403/170 |
| 4,780,344 A | | 10/1988 | Hoberman | |
| 4,942,700 A | | 7/1990 | Hoberman | |
| 4,981,732 A | | 1/1991 | Hoberman | |
| 4,998,552 A | * | 3/1991 | Niksic | E04B 1/3441 135/136 |
| 5,024,031 A | | 6/1991 | Hoberman | |
| 5,234,727 A | | 8/1993 | Hoberman | |
| 5,394,661 A | * | 3/1995 | Noble | E02D 27/34 52/1 |
| 5,448,868 A | * | 9/1995 | Lalvani | A63B 9/00 52/648.1 |

(Continued)

OTHER PUBLICATIONS

Tachi, "Composite Rigid-Foldable Curved Origami Structure", Proceedings of the First Conference Transformables 2013. In the Honor of Emilio Perez Pifiero, Sep. 18-20, 2013, School of Architecture, Seville, Spain, Editorial Starbooks. Felix Escrig and Jose Sanchez (eds.).

(Continued)

*Primary Examiner* — Phi D A
(74) *Attorney, Agent, or Firm* — Gottlieb, Rackman & Reisman, P.C.

(57) ABSTRACT

A foldable unit comprised of linkages in the form of tubular prisms is provided. The unit may be additionally comprised of polygonal panels. Linkages and panels correspond to a central polyhedral design that may be specified from a wide variety of geometric arrangements.

17 Claims, 16 Drawing Sheets

(56) References Cited

U.S. PATENT DOCUMENTS

| | | | |
|---|---|---|---|
| 5,452,555 A * | 9/1995 | Lee | E04B 1/3211 403/388 |
| 6,082,056 A | 7/2000 | Hoberman | |
| 6,190,231 B1 | 2/2001 | Hoberman | |
| 6,219,974 B1 | 4/2001 | Hoberman | |
| 6,282,849 B1 * | 9/2001 | Tuczek | E04B 1/32 52/648.1 |
| 6,578,593 B2 * | 6/2003 | Leonarz | E04H 15/48 135/143 |
| 6,739,098 B2 | 5/2004 | Hoberman | |
| 6,834,465 B2 | 12/2004 | Hoberman | |
| 6,869,246 B2 * | 3/2005 | Bridgers | F16B 7/048 135/122 |
| 7,036,277 B2 * | 5/2006 | Burginger | E04B 1/3211 52/79.4 |
| 7,100,333 B2 | 9/2006 | Hoberman | |
| 7,118,442 B2 | 10/2006 | Laliberte et al. | |
| 7,125,015 B2 | 10/2006 | Hoberman | |
| 7,438,623 B2 * | 10/2008 | Lin | A63H 33/086 446/104 |
| 7,464,503 B2 | 12/2008 | Hoberman | |
| 7,481,235 B2 * | 1/2009 | Prusmack | E04H 15/18 135/120.3 |
| 7,559,174 B2 | 7/2009 | Hoberman | |
| 7,584,777 B2 | 9/2009 | Hoberman | |
| 7,644,721 B2 | 1/2010 | Hoberman | |
| 7,794,019 B2 | 9/2010 | Hoberman | |
| 7,948,425 B2 | 5/2011 | Bernhardt et al. | |
| 7,992,353 B2 * | 8/2011 | Athan | E04B 1/19 403/116 |
| 8,615,970 B2 | 12/2013 | Hoberman | |
| 2002/0083675 A1 * | 7/2002 | Hoberman | A63F 9/088 52/645 |
| 2007/0051055 A1 * | 3/2007 | Lin | A63H 33/086 52/81.1 |
| 2008/0066393 A1 * | 3/2008 | Sorensen | A63H 33/101 52/81.1 |

OTHER PUBLICATIONS

Weina Wu et al., "A solution for folding rigid tall shopping bags", Department of Engineering Science, University of Oxford, UK, Mar. 1, 2011, © 2011 The Royal Society, Published online; Proc. R. Soc. A doi:10.1098/rspa.2011.0120; Downloaded from http://rspa.royalsocietypublishing.org.

Strobl, Heinz; "Special Snapology, A simple and cheap method to make convex polyhedra models"; Didaktik-Kolloquium am 26. Nov. 2010, Friedrich-Schiller-Universitat Jena; www.knotologie.de.

* cited by examiner

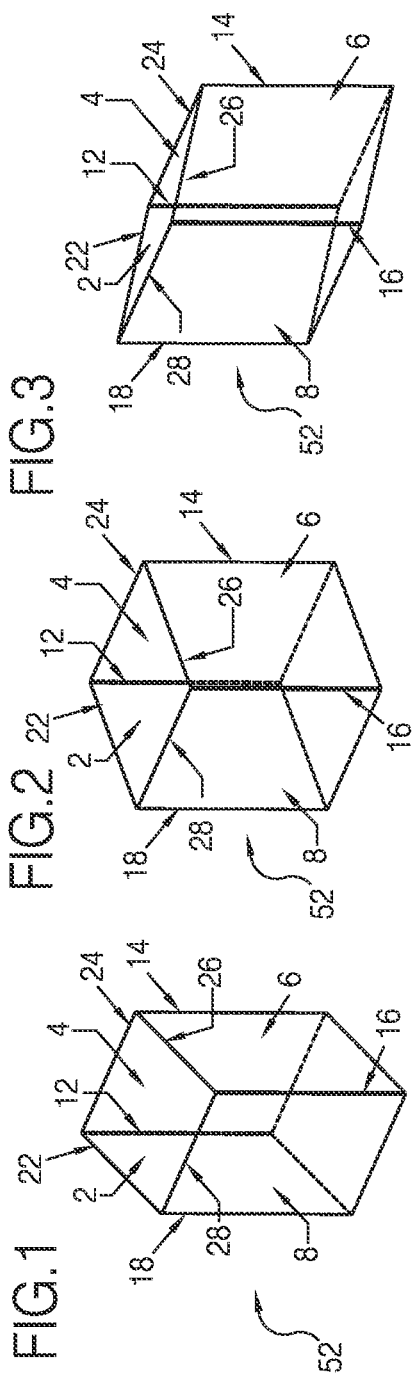

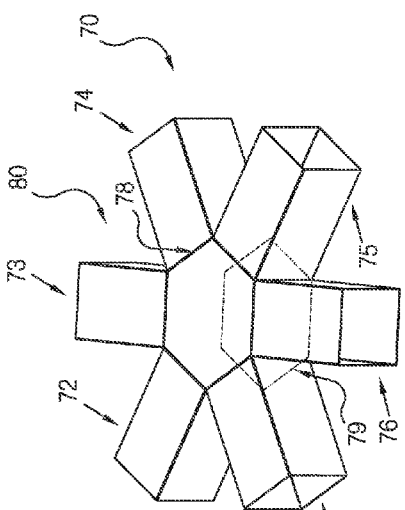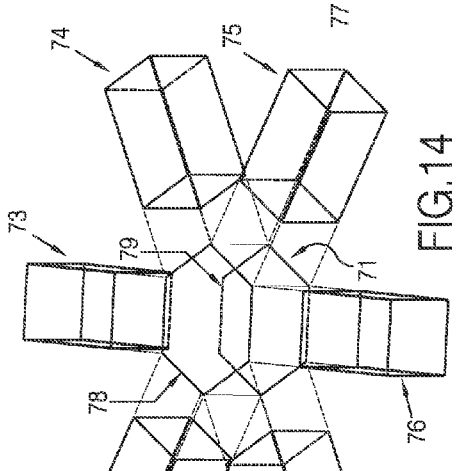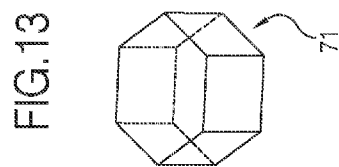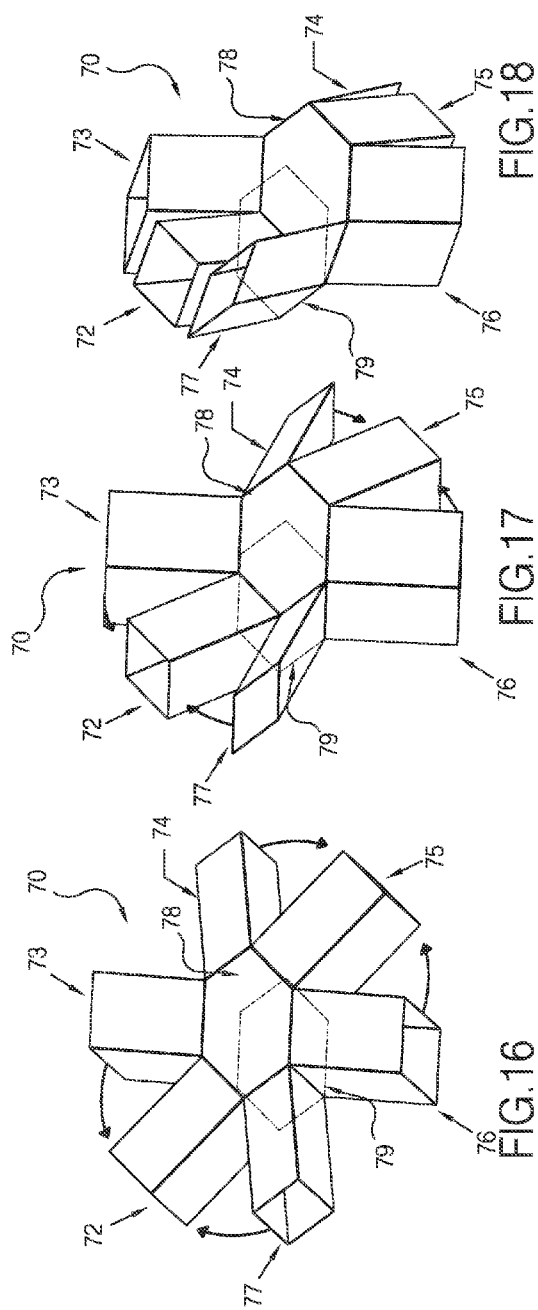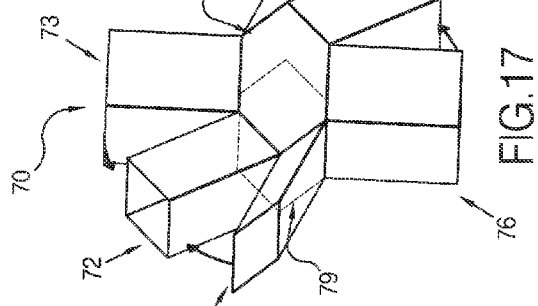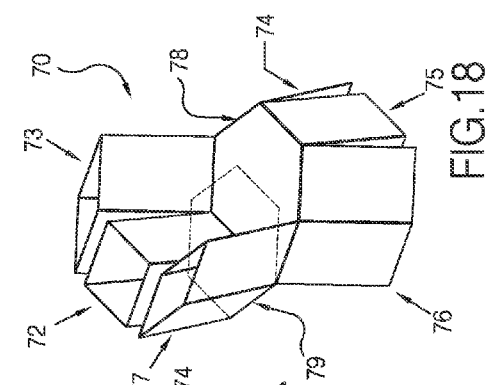

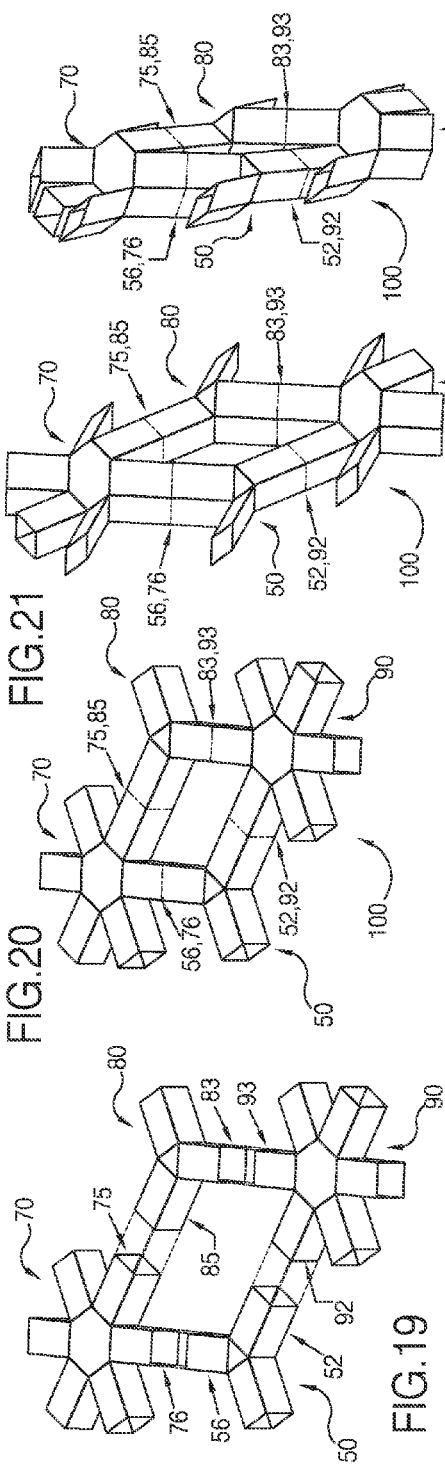

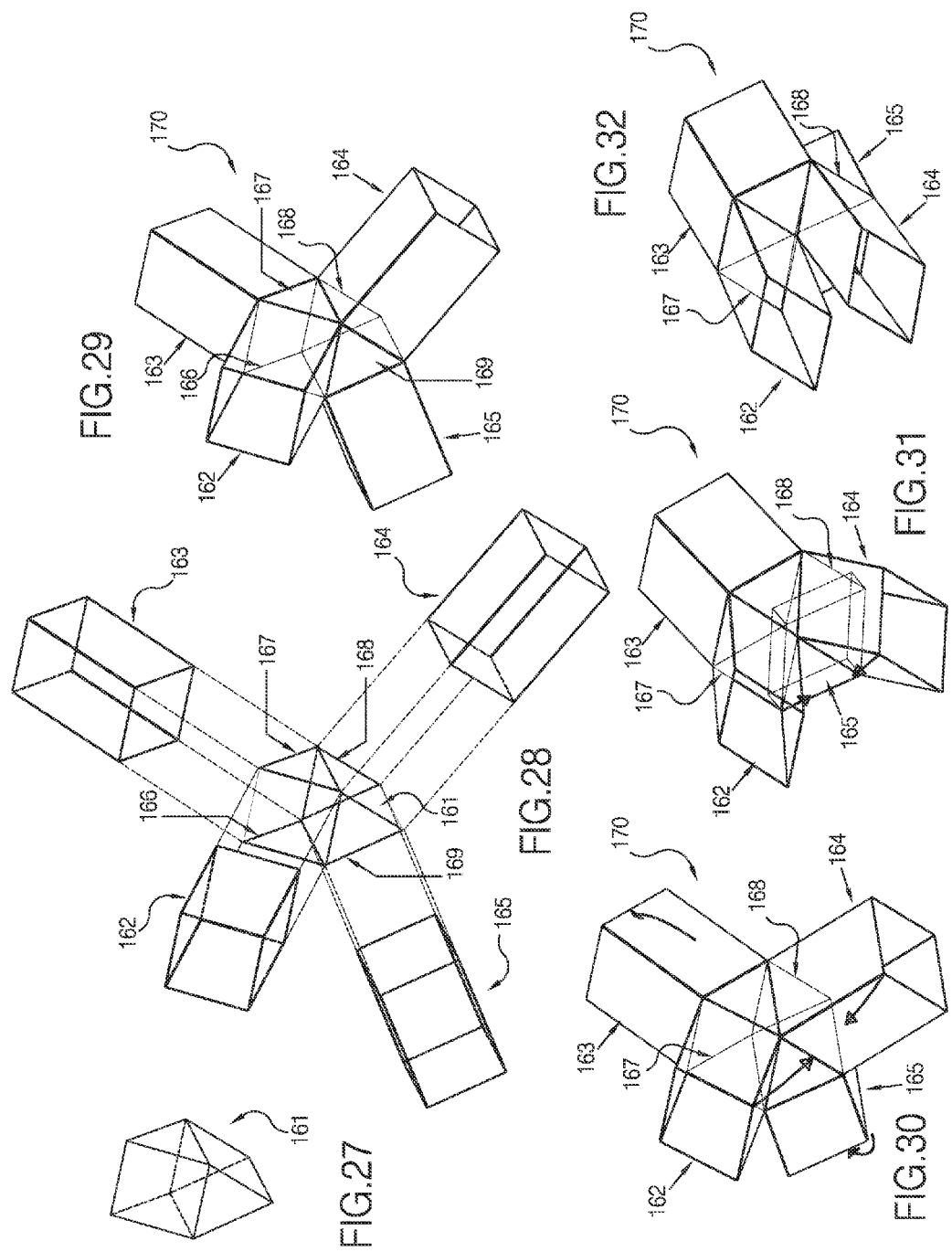

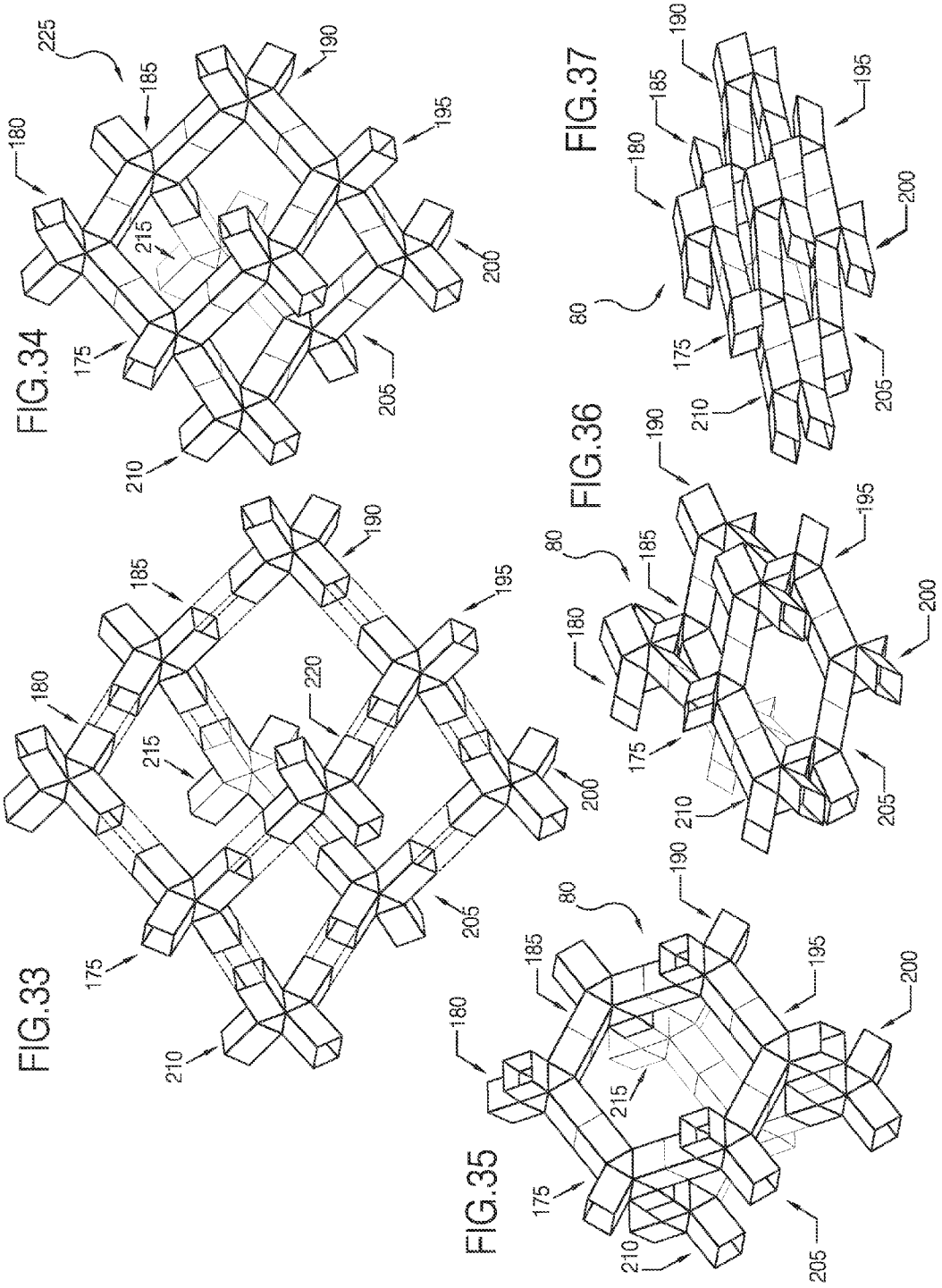

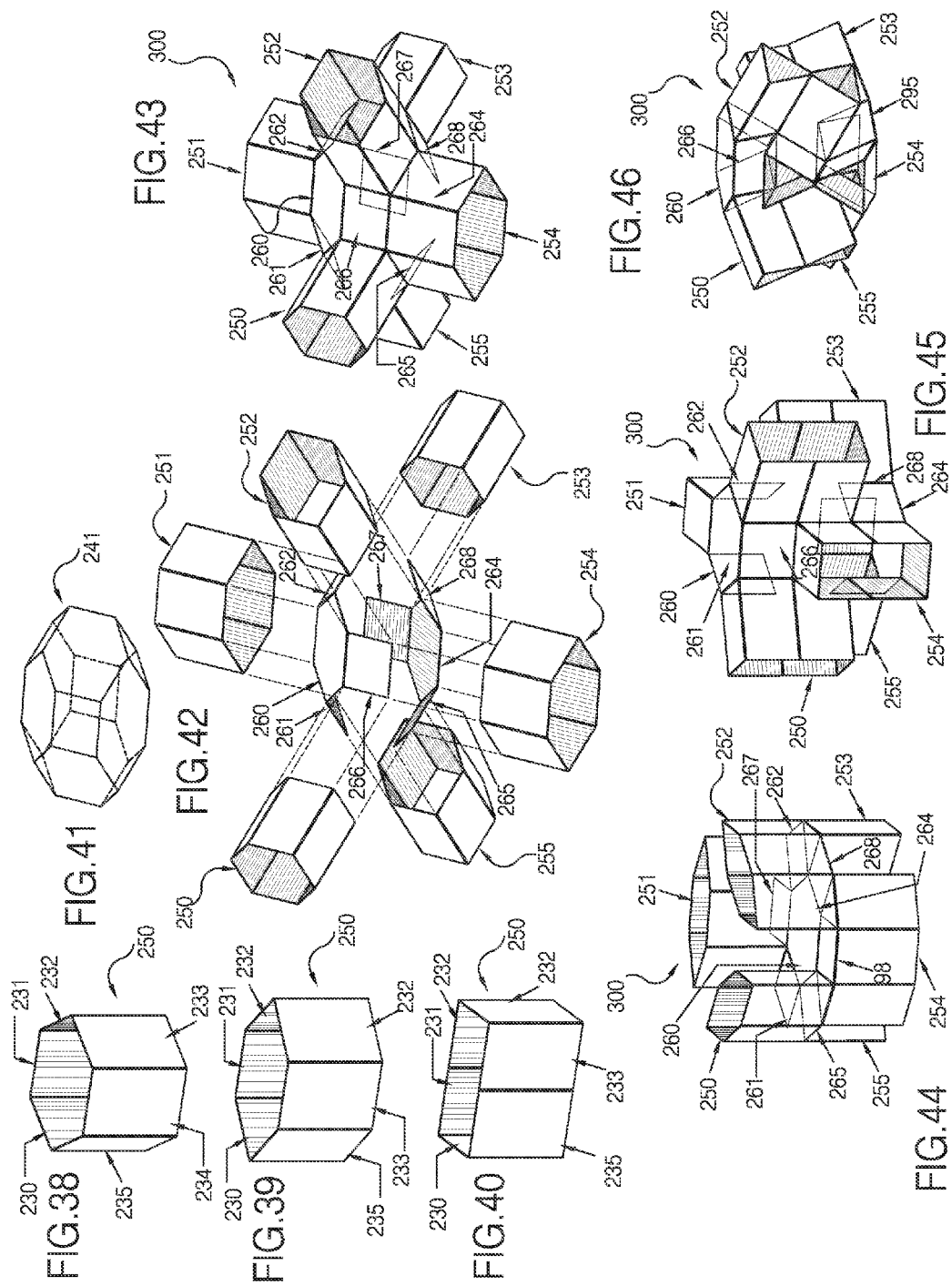

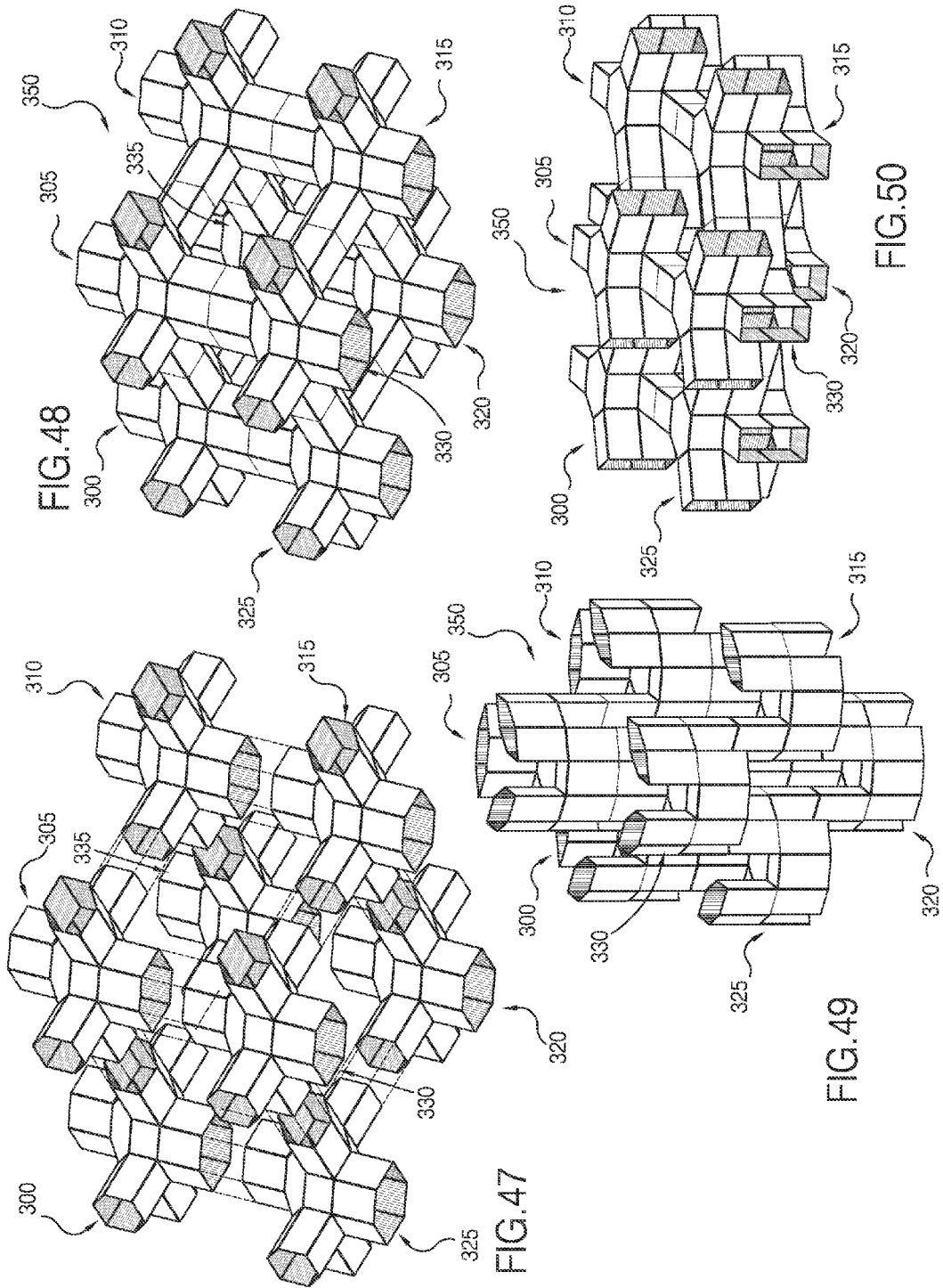

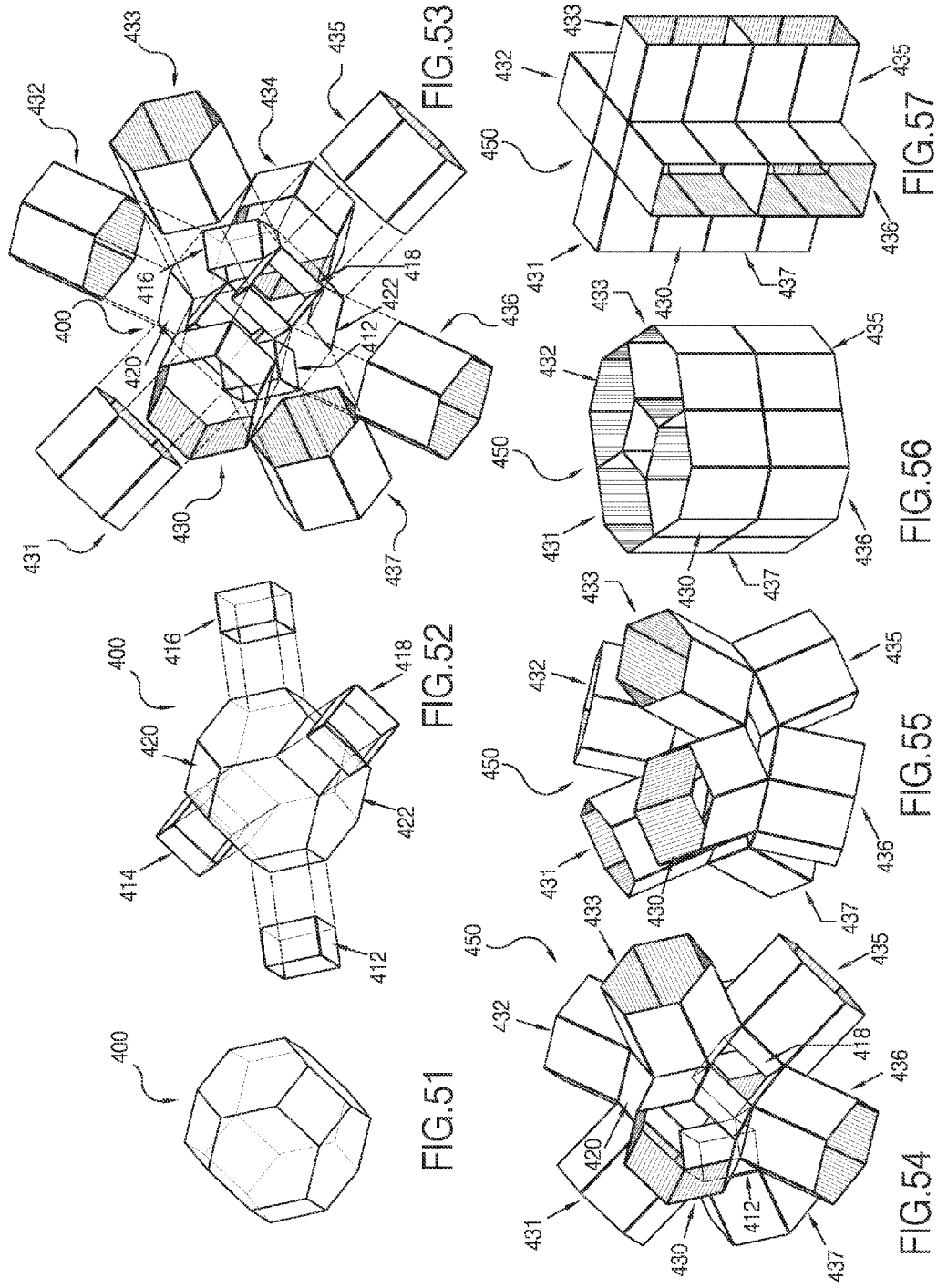

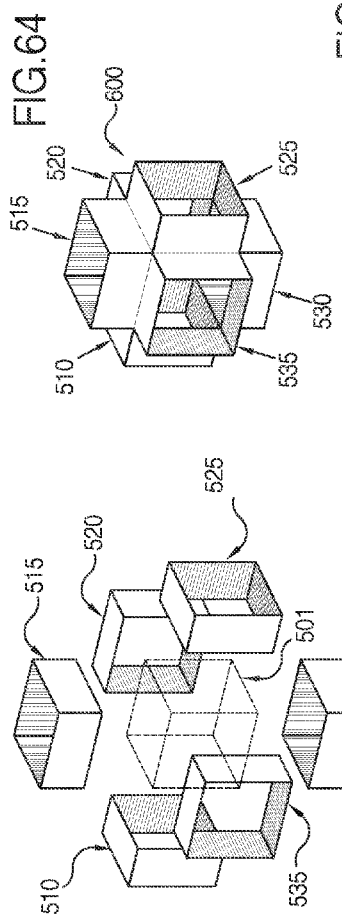
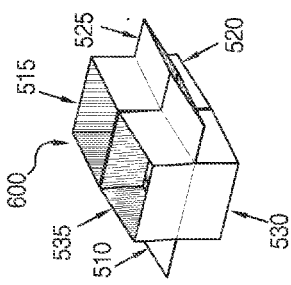
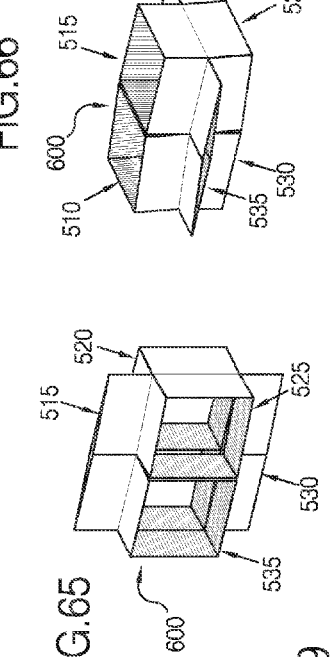
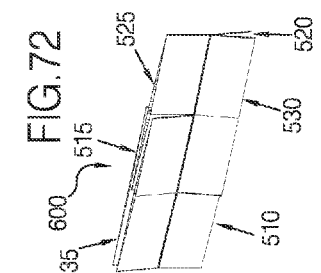
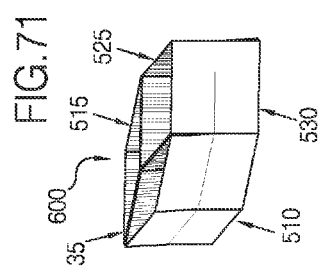
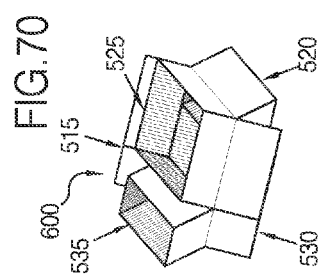
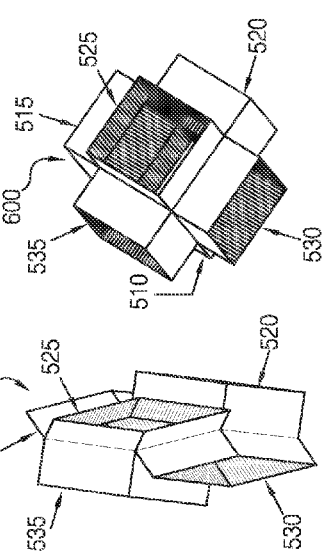

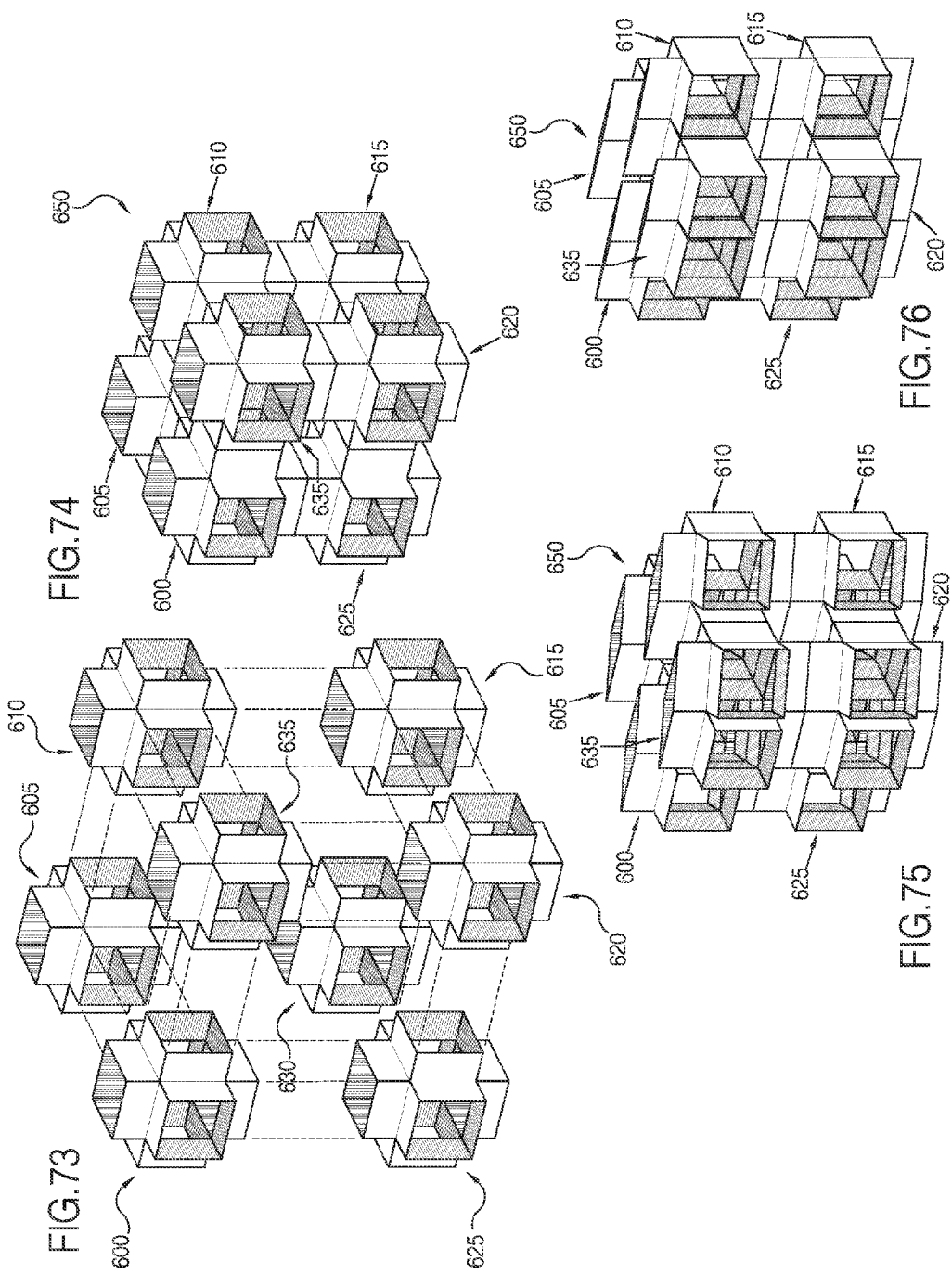

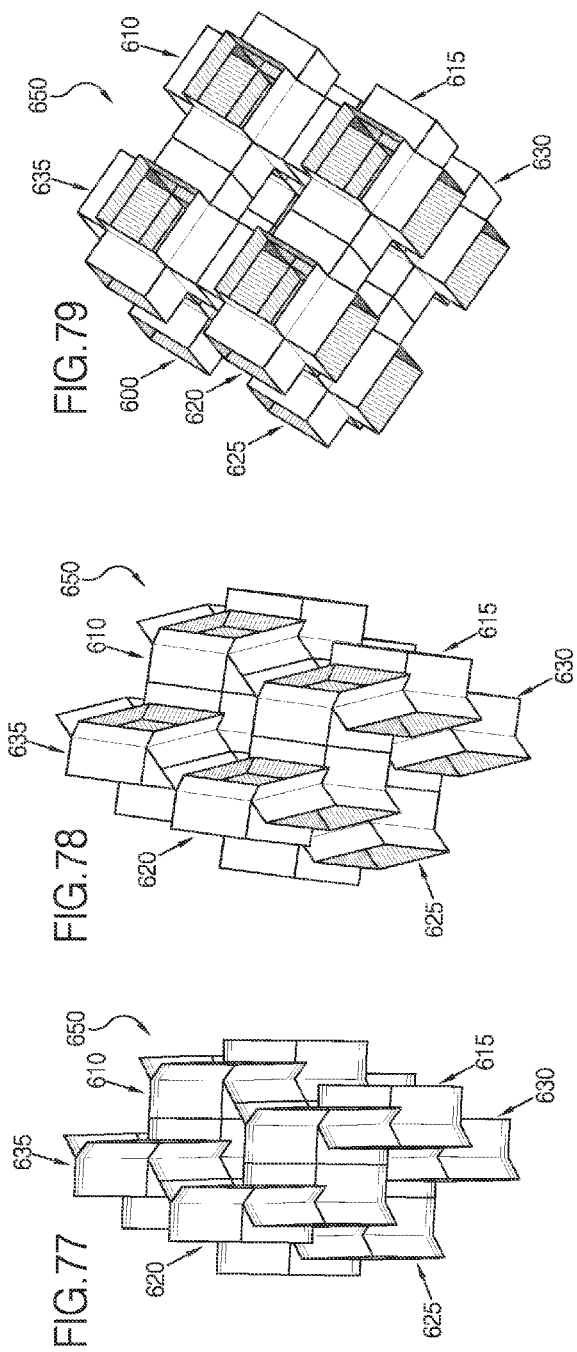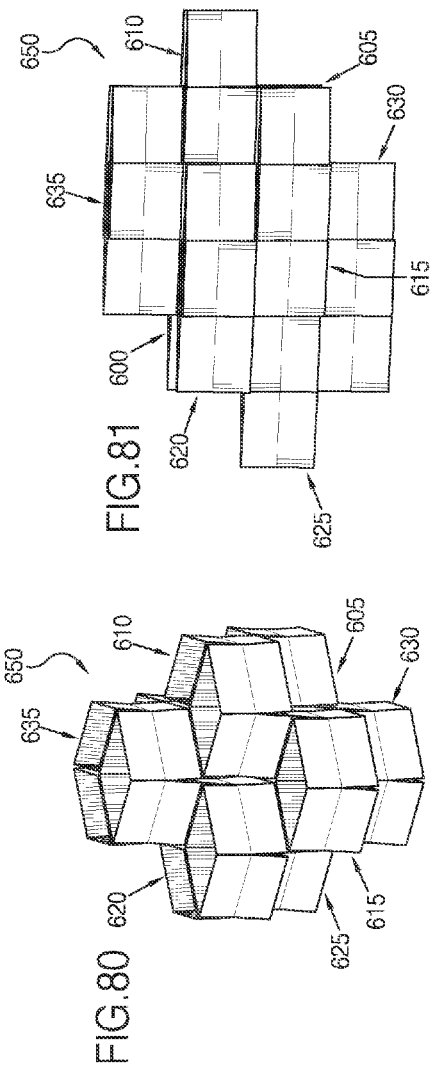

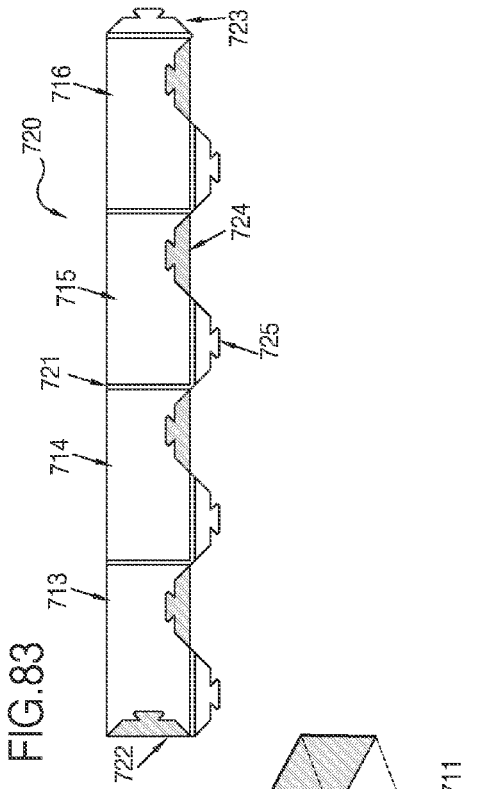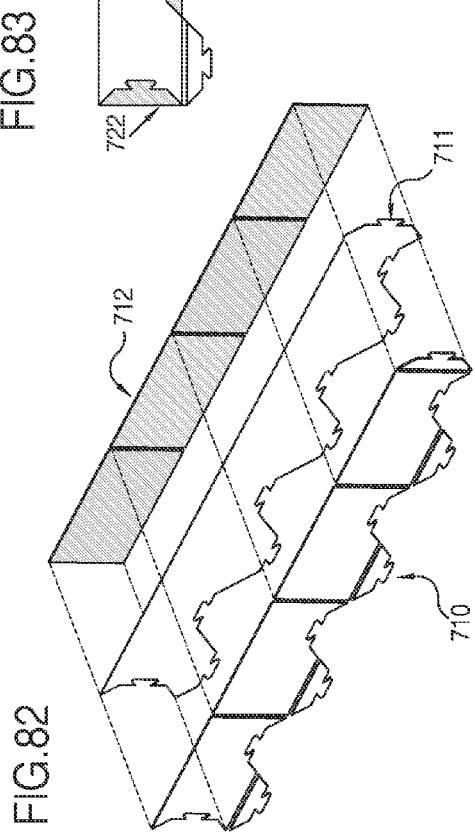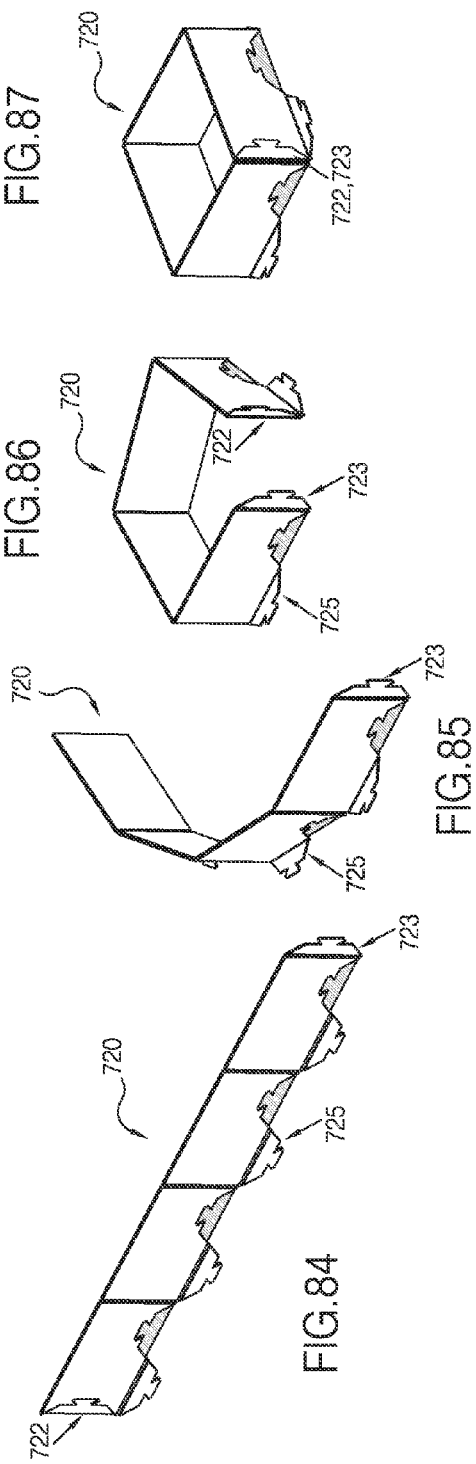

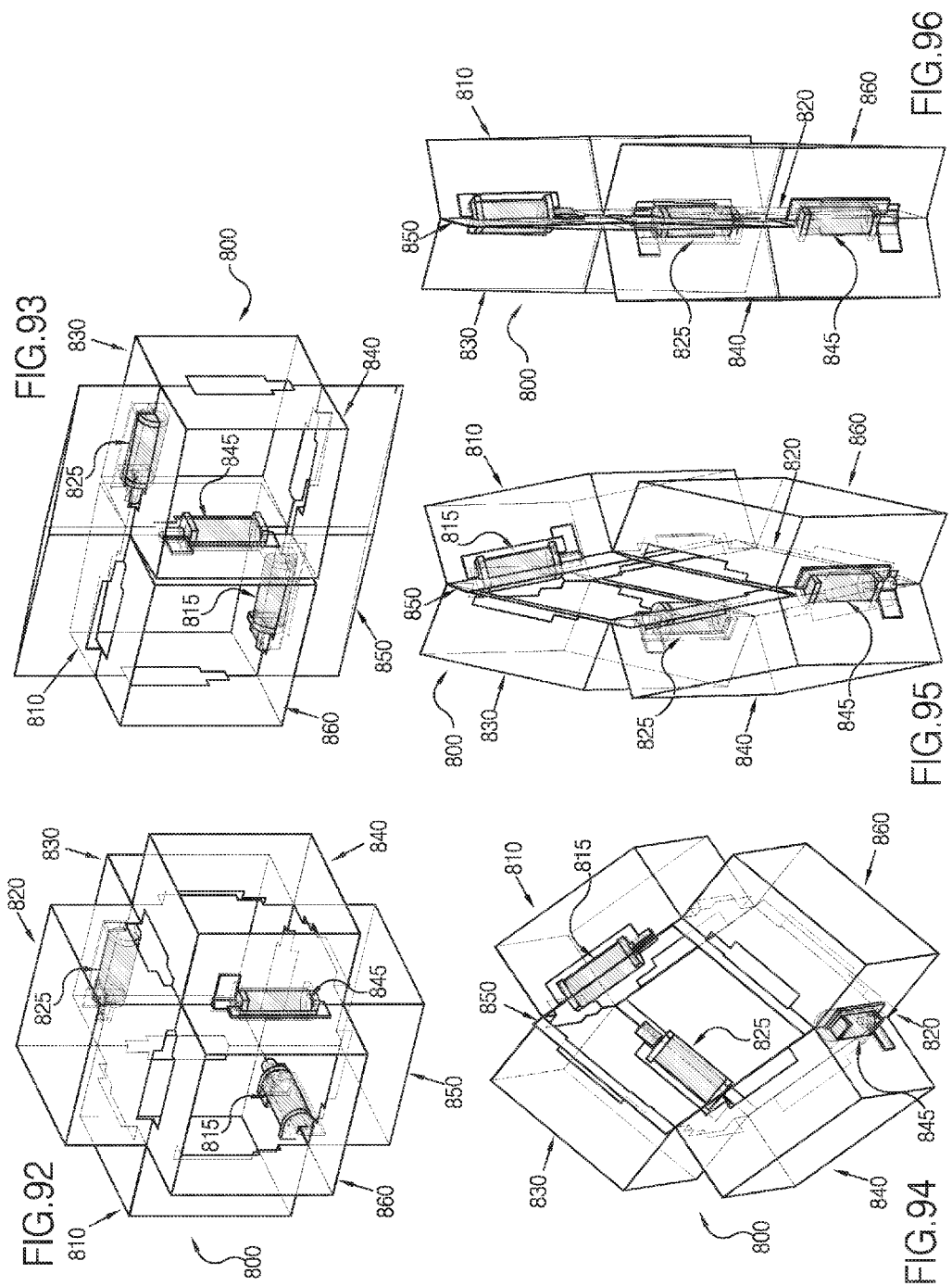

CONSTRUCTION METHOD FOR FOLDABLE UNITS

This application is based on and claims priority of U.S. Provisional Patent Application Ser. No. 62/023,240 filed Jul. 11, 2014.

BACKGROUND OF THE INVENTION

Mechanisms convert forces into movement; structures resist forces to maintain stability. Deployable structures are, in effect, hybrids embodying both structural and mechanical behaviors.

In general, there are two types of deployable structures: those comprised of mechanical linkages, and those based on folding principles similar to origami shapes. Each type utilizes a different approach to material composition and fabrication techniques. Beyond considerations of physical construction, there are significant differences between each type in terms of their geometric organization and kinematic constraints.

What are the comparative advantages mechanical vs. origami-based structures? As a broad generalization, linkage based structures give the designer more freedom to select and optimize both mechanical performance and spatial configurations. There are fewer constraints in configuring link-joint arrangements of mechanical assemblies than in folding sheet-hinge arrangements. This freedom increases the ease in achieving both strength and controlled movement by incorporating structurally favorable shapes, optimized boundary conditions and kinematically redundant networks.

Nonetheless, origami-type deployable structures have significant advantages as well. One advantage is that surface and structure are, in effect, one entity, eliminating the need to add additional covering or cladding. A second benefit is that the cost of construction is economical. Manufacture can be efficiently performed by 2D sheet-based machinery such as laser-cutters or water-jets. Plates and hinges may be developed as material laminates and assembly may be minimized through simple folding processes.

This invention discloses a novel and unique class of folding mechanisms that combine benefits of both mechanical and origami approaches. Structures built according to this system have an origami-like folded construction. Yet at the same time, like many mechanically deployable structures, they are comprised of synchronized linkages that can be arranged in wide variety of structural compositions.

Structures built according to this invention are based on folding units that correspond to various polyhedral shapes. Units can be assembled into three dimensional lattice-like assemblies that maintain a high degree of synchronization and structural integrity during folding.

SUMMARY OF THE INVENTION

A foldable unit comprised of linkages in the form of tubular prisms is provided. The unit may be additionally comprised of polygonal panels. Linkages and panels correspond to a central polyhedral design that may be specified from a wide variety of geometric arrangements.

Also disclosed are means to connect foldable units together by fixed connections between linkages, thus making foldable assemblies. Such assemblies, which may aggregate as many units as desired, extend in either two or three dimensions. Assemblies thus formed retain the kinematic behavior of the unit itself.

Certain embodiments of units and assemblies under this invention are capable of being substantially flattened for ease of packing and transport.

Further disclosed are modular linkage elements that provide universal building blocks for creating a wide variety of foldable units and structural arrangements.

Accordingly, it is an object of the invention to provide foldable mechanisms or units which utilize both mechanical and origami approaches.

Another object of the invention is to provide a foldable mechanism or unit which incorporates synchronized linkages that can be arranged in numerous configurations.

A further object of the invention is to provide foldable mechanisms or units which correspond to various polyhedral shapes.

Other objects of the invention will be apparent from the following description.

BRIEF DESCRIPTION

For a fuller understanding of the invention, reference is made to the following drawings in which:

FIG. 1 shows four-sided linkage 52 which in the form of a tubular prism.

FIGS. 2 and 3 show perspective views of linkage 52 in successively folded positions.

FIGS. 4, 5 and 6 show plan views of linkage 52 in three successively folded positions.

Figure 8:
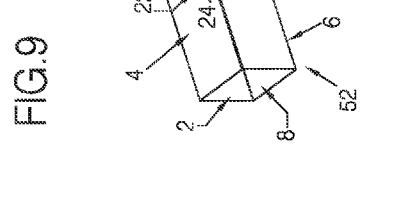

FIG. 8 shows linkages 52,54,56, and panels 57,58 in exploded view around polyhedral design 51.

Figure 9:
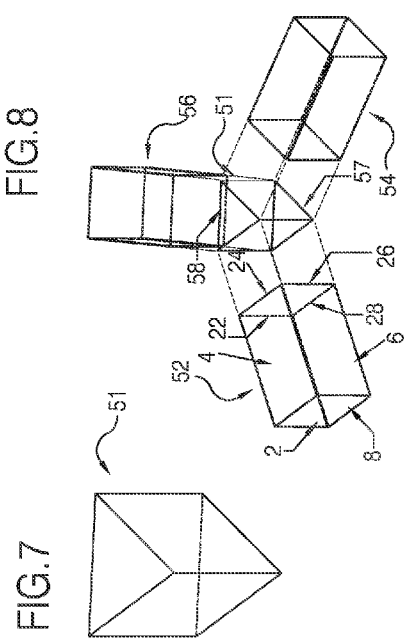

FIG. 9 shows folding unit 60 where linkages 52,54 and 56, panels 57, 58 have been hingedly connected as shown.

Figure 12:
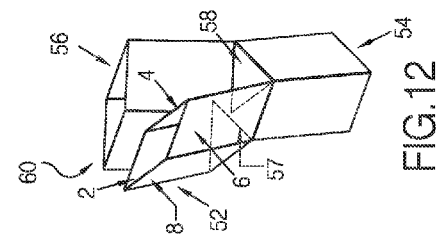
Figure 11:
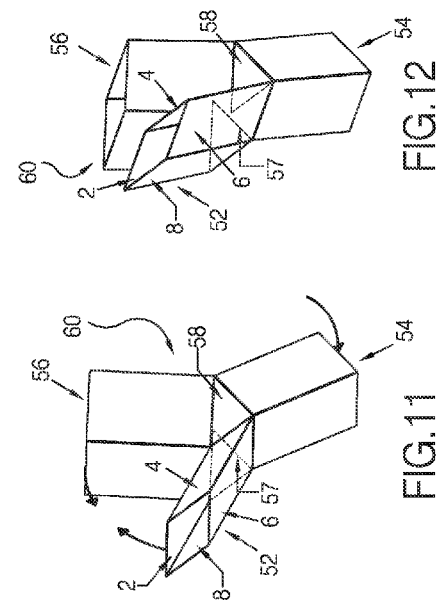
Figure 10:
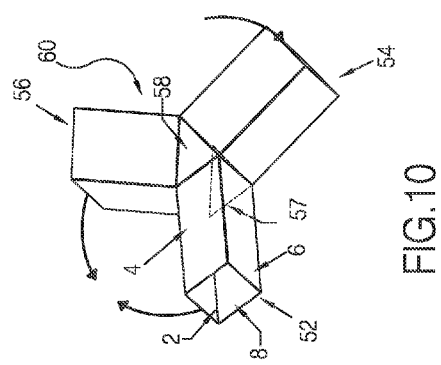

FIGS. 10, 11 and 12 show folding unit 60 in successively folded positions.

FIG. 13 shows a six-sided prism 71: a central polyhedral design to define a second folding unit.

FIG. 14 shows linkages 72,73,74,75,76,77 and panels 78,79 in exploded view around polyhedral design 71.

FIG. 15 shows folding unit 70 where linkages 72,73,74, 75,76,77 and panels 78,79 have been hingedly connected as shown.

FIGS. 16, 17 and 18 show folding unit 70 in successively folded positions.

FIG. 19 shows folding units 50,70,80 and 90 in an exploded perspective view.

FIG. 20 shows a folding assembly 100 where units 50,70,80 and 90 are joined together by fixed connections as shown.

FIGS. 21 and 22 show folding assembly 100 in two successive positions.

FIG. 23 shows folding units 50, 70, 80 and 90 in an exploded plan view.

FIGS. 24, 25 and 26 show plan views of folding assembly 100 in three successive positions.

FIG. 27 shows polyhedron 161 which is a central polyhedral design to define another folding unit under this invention.

FIG. 28 shows linkages 162, 163,164,165 and panels 166,167,168,169 in exploded view around polyhedron 161.

FIG. 29 shows unit 170 where linkages 162, 163,164,165 and panels 166,167,168,169 have been hingedly joined together as shown.

FIGS. 30,31 and 32 show unit 170 in successively folded positions.

FIG. 33 shows ten units 175,180,185,190,195,200,205, 210,215 and 220 in an exploded perspective view.

FIG. 34 shows a folding assembly 225 where the ten units are joined together by fixed connections as shown.

FIGS. 35,36 and 37 show assembly 225 in successively folded positions.

FIG. 38 shows a perspective view of six-sided linkage 250 which is in the form of a tubular prism.

FIGS. 39 and 40 show perspective views of linkage 250 in successively folded positions.

FIG. 41 shows polyhedron 241 which is a central polyhedral design to define another folding unit under this invention.

FIG. 42 shows six linkages 250,251,252,253,254, 255 and eight panels 260,264, 261,262,265,266,267,268 in exploded view around polyhedron 241.

FIG. 43 shows folding unit 300 where the six linkages and eight panels have been hingedly connected as shown.

FIGS. 44,45 and 46 show folding unit 300 in successively folded positions.

FIG. 47 shows eight folding units 300,305,310,315,320, 325,330 and 335 in an exploded perspective view.

FIG. 48 shows a folding assembly 350 where the eight units are joined together by fixed connections as shown.

FIGS. 49 and 50 show assembly 350 in further folded positions.

FIG. 51 shows polyhedron 400 which is a central polyhedral design to define another folding unit under this invention.

In FIG. 52 shows linkages 412,414,416,418 and panels 420,422 in exploded view around polyhedron 400.

FIG. 53 shows eight additional linkages 430,431,432,433, 434,435,436 and 437 in exploded view around polyhedron 400.

FIG. 54 shows folding unit 450 where the twelve linkages and two panels have been hingedly connected as shown.

FIGS. 55,56 and 57 show folding unit 450 in successively folded positions.

Figure 58:
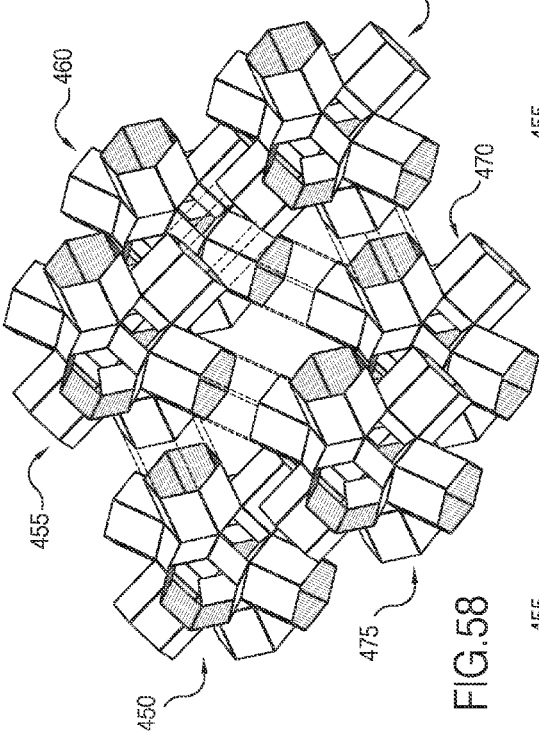

FIG. 58 shows six units 450,455,460,465,470 and 475 in an exploded perspective view.

Figure 59:
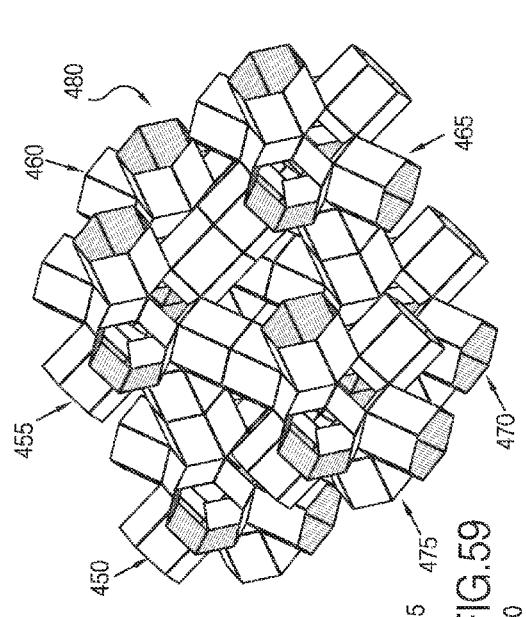

FIG. 59 shows folding assembly 480 where the six units have been joined together by fixed connections as shown.

Figure 62:
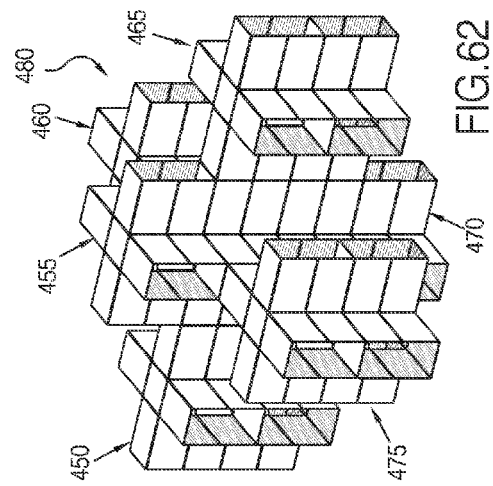
Figure 61:
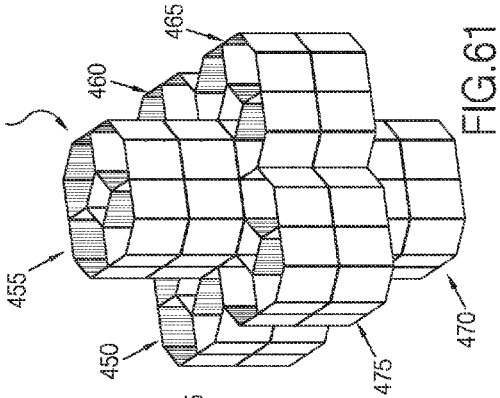
Figure 60:
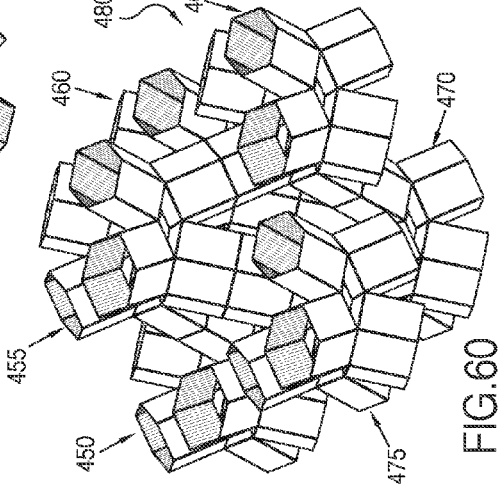

FIGS. 60,61 and 62 show assembly 480 in successively folded positions.

FIG. 63 shows six linkages 510,515,520,525,530 and 535 in exploded view around polyhedral design 501.

FIG. 64 shows folding unit 600 where the six linkages have been hingedly connected.

FIGS. 65-71 show unit 600 in a series of positions.

FIG. 72 shows unit 600 in a flattened position.

FIG. 73 shows eight units 600,605,610,615,620,625,630 and 635 in an exploded perspective view.

FIG. 74 shows a folding assembly 650 where the eight units have been joined together by fixed connections as shown.

FIGS. 75-80 show assembly 650 in successively further folded positions.

FIG. 81 shows assembly 650 in a flattened position.

FIG. 82 shows an exploded view of a three layers 710, 711 and 712 that may be laminated together to form a linkage.

FIG. 83 shows a plan view of the assembled laminate 720.

FIG. 84 shows a perspective view of laminate 720 in a flat configuration.

FIGS. 85, 86 and 87 show 720 in successive folded positions as it is formed into a linkage.

Figure 88:
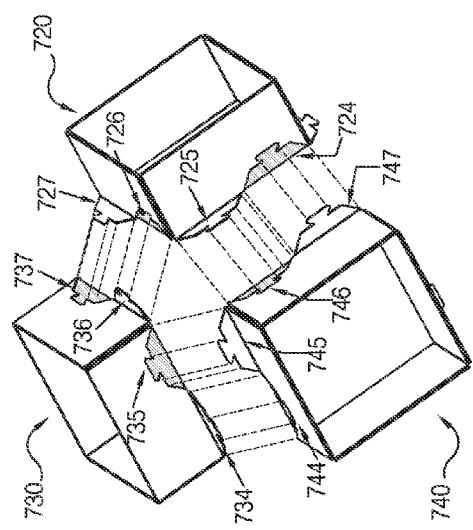

FIG. 88 shows three modular linkages 720,730 and 740 in exploded view.

Figure 89:
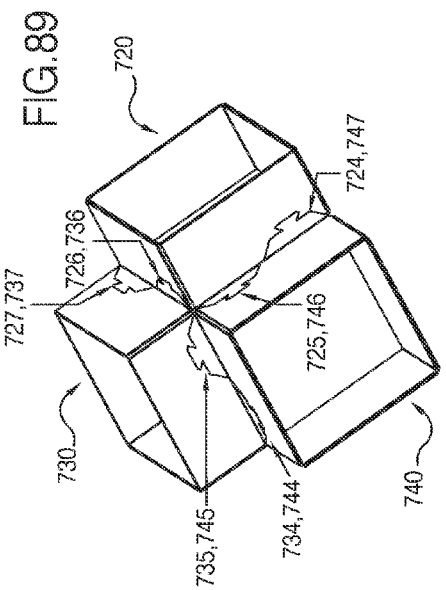

FIG. 89 shows linkages 720,730 and 740 having been joined together by making fixed connections as shown.

Figure 91:
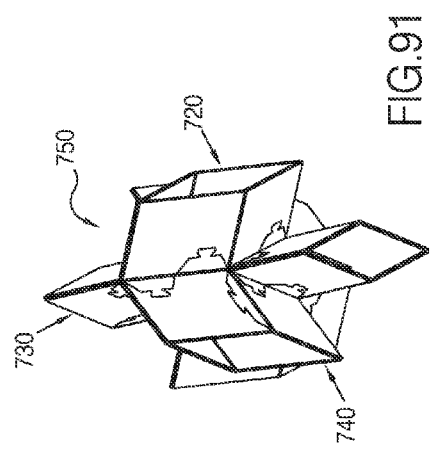
Figure 90:
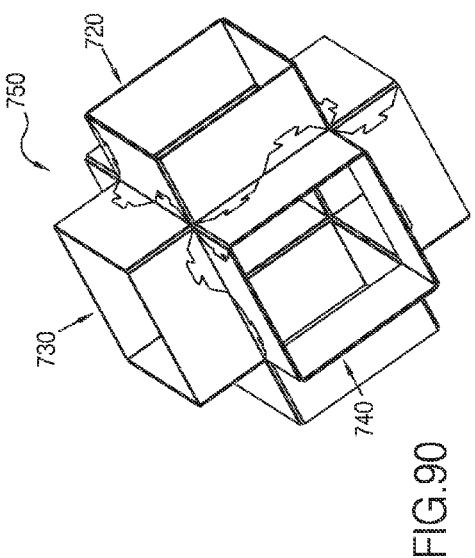

FIGS. 90 and 91 show reconfigurable unit 750 in two positions.

FIG. 92 shows unit 800 which is comprised of six linkages 810,820,830,840,850 and 860 and three motors 815, 825 and 845.

FIGS. 93,94,95 and 96 show unit 800 in various positions as controlled by motors 815, 825 and 845.

DETAILED DESCRIPTION

FIG. 1 shows a perspective view of a linkage 52 which is in the form of a tubular prism and is comprised of four planar links 2,4,6 and 8 which are connected by hinges 12,14,16 and 18 in a closed loop. Hinges 12,14,16 and 18 are all parallel to one another defining an extruded direction. Link 2 has an end edge 22. Likewise links 4,6 and 8 have end edges 24,26 and 28 respectively. Edges 22,24,26 and 28 which are non-parallel to the extruded direction, lie in a common plane.

FIGS. 2 and 3 show perspective views of linkage 52 in successively folded positions. Extruded hinges 12,14,16 and 18 remain parallel to one another, and end edges 22,24,26 and 28 continue to share a common plane. FIGS. 4, 5 and 6 show plan views of linkage 52 in three successively folded positions corresponding to FIGS. 1,2 and 3 respectively. Linkage 52 is essentially an extrusion of the polygons that are shown in FIGS. 4, 5 and 6.

Figure 7:
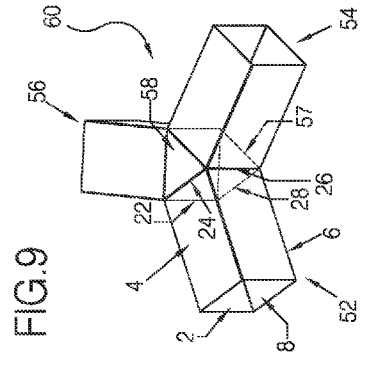
FIG. 7 shows a three-sided prism 51: a central polyhedral design to define a first folding unit.

FIG. 7 shows a three-sided prism 51 which is a central polyhedral design that will define a folding unit according to an embodiment of this invention.

FIG. 8 shows three linkages 52, 54 and 56 in exploded view around polyhedral design 51. Also shown are two triangular panels 57 and 58.

FIG. 9 shows folding unit 60 where linkage 52 has been hingedly joined to panel 58 by edge 24. Linkage 52 has also been hingedly joined to linkage 54 by edge 26; to panel 57 by edge 28 and to linkage 56 by edge 22. In a similar fashion linkages 54 and 56 have been joined to each other by one each of their end edges, to panel 57 by one each of their end edges, and to panel 58 by one each of their end edges.

FIGS. 10, 11 and 12 show folding unit 60 in successively folded positions. As panels 57 and 58 are shifted relative to one another, the extruded directions of linkages 52 and 56 are reoriented as they draw together. Simultaneously, planar links 2, 4, 6 and 8 change their angles relative to each other and take on a more flattened configuration. As the same time, linkage 54 swings downwards.

FIG. 13 shows a six-sided prism 71 which is a central polyhedral design that will define a folding unit according to a second embodiment of this invention.

FIG. 14 shows six linkages 72,73,74,75,76 and 77 in exploded view around polyhedral design 71. Also shown are two hexagonal panels 78 and 79.

FIG. 15 shows folding unit 70. Linkage 72 is hingedly connected by its end edges to neighboring linkages 73 and 77 and panels 78 and 79. Similarly linkages 73,74,75,76 and 77 are hingedly connected to neighboring linkages by two each of their end edges, and to panels 78 and 79 by their remaining end edges.

FIGS. 16, 17 and 18 show folding unit 70 in successively folded positions. As panels 78 and 79 are shifted relative to one another, there is a reorientation of the extruded directions of linkages 77, 72 and 73 as they draw together above panels 78 and 79. Likewise the extruded directions of linkages 74,75 and 76 draw together below panels 78 and 79.

As linkages 72,73,74,75,76 and 77 reorient their direction, they take on a more or less flattened configuration to accommodate their new positions.

FIG. 19 shows folding units 50, 70, 80 and 90 in an exploded perspective view. Units 50 and 80 each have three linkages, and units 70 and 90 each have six linkages.

FIG. 20 shows a folding assembly 100. Units 50 and 70 are joined together by fixed connections between the end edges of linkages 56 and 76. Similarly units 70,80 and 80,90 and 90,50 are respectively joined to each other by their end edges 75,85 and 83,93 and 92,52.

The joined linkages of units 50, 70, 80 and 90 form a closed loop. Joined linkage 75,85 has a parallel orientation to joined linkage 52,82. Likewise joined linkage 56,76 has a parallel orientation to joined linkage 83,93.

FIGS. 21 and 22 show folding assembly 100 in two successive positions. Joined linkage 75,85 maintains a parallel orientation to joined linkage 52,82. Likewise joined linkage 56,76 is maintains a parallel orientation to joined linkage 83,93. Folding assembly 100 is thus a parallel mechanism that is itself comprised of multiple linkages.

FIG. 23 shows folding units 50, 70, 80 and 90 in an exploded plan view.

FIGS. 24, 25 and 26 show plan views of folding assembly 100 in three successive positions.

FIG. 27 shows a polyhedron 161 comprised of four triangular faces and four rectangular faces defining the central polyhedral design of a folding unit according to another embodiment of this invention. In FIG. 28 four linkages 162, 163,164 and 165 are shown in exploded view around polyhedral design 161. Also shown are four triangular panels 166,167,168 and 169.

FIG. 29 shows folding unit 170. Linkage 162 is hingedly connected to linkage 163 by one end edge, and is further connected to panels 166,167 and 169 by its three other edges. Similarly linkages 163,164 and 165 are each hingedly connected to another linkage by one end edge, and connected to three triangular panels by their remaining edges respectively.

FIGS. 30,31 and 32 show folding unit 170 in successively folded positions. As panels 166,167,168 and 169 shift towards a flattened configuration, the extruded directions of linkages 162 and 164 draw closer together. Likewise, the extruded directions of linkages 163 and 165 draw closer together. As linkages 162, 163,164 and 165 reorient their direction, they take on a more or less flattened configuration to accommodate their new positions.

FIG. 33 shows folding units 175,180,185,190,195,200, 205,210,215 and 220 in an exploded perspective view. FIG. 34 shows a folding assembly 225. Folding unit 180 is joined to units 175 and 185 by fixed connections between end edges of their respective neighboring linkages. Similarly, each folding unit is connected to other units by fixed connections between their end edges of neighboring linkages. FIGS. 35, 36 and 37 show assembly 225 in successively further folded positions.

FIG. 38 shows a perspective view of a linkage 250 which is in the form of a tubular prism and is comprised of six planar links 230,231,232,233,234 and 235 which are connected by six parallel hinges in a closed loop. The upper edges of these six links lie in a common plane.

FIGS. 39 and 40 show perspective views of linkage 250 in successively folded positions. The upper edges of links 230,231,232,233,234 and 235 continue to lie in a common plane.

FIG. 41 shows polyhedron 241 which is comprised of six rectangular faces and eight hexagonal faces, defining the central polyhedral design of a folding unit according to another embodiment of this invention.

In FIG. 42 six linkages 250,251,252,253,254 and 255, each having six links, are shown in exploded view around polyhedral design 241. Also shown are two hexagonal panels 260,264 as well as six rectangular panels 261,262, 265,266,267 and 268.

FIG. 43 shows folding unit 300. Six sided linkage 250 is hingedly connected to linkages 254 and 255 by two of its end edges, and is further connected to panels 260,261,265 and 266 by its four end other edges. Similarly linkages 251,252,253,254 and 255 are each hingedly connected to two neighboring linkages by two edges each, and connected to four panels by their remaining edges respectively.

FIGS. 44, 45 and 46 show folding unit 300 in successively folded positions. Linkages 250,251,252,253,254 and 255 take on various shapes and, at the same time, reorient their extruded directions relative to each other.

FIG. 47 shows folding units 300,305,310,315,320,325, 330 and 335 in an exploded perspective view. FIG. 48 shows a folding assembly 350. Folding unit 330 is joined to units 305,315 and 325 by fixed connections between end edges of their respective neighboring linkages. Similarly, each folding unit within assembly 350 is connected to other units by fixed connections between their end edges of neighboring linkages. FIGS. 49 and 50 show assembly 350 in successively further folded positions.

FIG. 51 shows polyhedron 400 which is comprised of six rectangular faces and eight hexagonal faces defining the central polyhedral design of a folding unit according to another embodiment of this invention. While polyhedral design 400 has the same basic geometry as polyhedral design unit 241 shown in FIG. 41, the folding unit that is derived will utilize a different arrangement of links and panels.

In FIG. 52 four linkages 412,414,416 and 418, each having four links, are shown in exploded view around polyhedral design unit 400. Also shown are two rectangular panels 420 and 422.

In FIG. 53 eight linkages 430,431,432,433,434,435,436 and 437, each having six links, are shown in exploded view around polyhedral design 400. Also shown are four-sided linkages 412,414,416 and 418 as well as panels 420 and 422.

FIG. 54 shows folding unit 450. Six sided linkage 430 is hingedly connected to linkages 431,433 and 436 by three of its end edges, is further connected to four-sided linkages 412 and 418 by two of its edges, and is further connected to panel 420 by its remaining edge. Similarly linkages 431,432,433, 434,435,436 and 437 are each hingedly connected to three neighboring six-sided linkages, two neighboring four-sided linkages and to one panel respectively.

FIGS. 55,56 and 57 show folding unit 450 in successively folded positions. Linkages 430,431,432,433,434,435,436 and 437 take on various shapes and, at the same time, reorient their extruded directions relative to each other.

FIG. 58 shows folding units 450,455,460,465,470 and 475 in an exploded perspective view. FIG. 59 shows folding assembly 480. Unit 455 is joined to units 450,460,465 and 475 by fixed connections between end edges of their respective neighboring linkages. Similarly, each folding unit within assembly 480 is connected to other units by fixed connections between their end edges of neighboring linkages. FIGS. 60,61 and 62 show assembly 480 in successively further folded positions.

FIG. 63 shows central polyhedral design 501 which is in the form of a cube. Six linkages 510,515,520,525,530 and 535 shown in exploded view around polyhedral design 501.

FIG. 64 shows folding unit 600. Linkage 515 is hingedly connected to linkages 510,520,525 and 535 by each of its four end edges. Likewise linkages 510,520,525,530 and 535 are all connected to four neighboring linkage by each of their four end edges.

FIG. 65 shows unit 600 in a second position where linkages 515 and 530 have been flattened relative to their configuration in FIG. 64, while linkages 510,520,525 and 535 remain in their original square configuration.

FIG. 66 shows unit 600 in a third position where linkages 520 and 535 are successively flattened relative to their configuration in FIG. 64, while linkages 510,515,525 and 530 remain in their original square configuration.

FIG. 67 shows unit 600 in a third position where linkages 510 and 525 are successively flattened relative to their configuration in FIG. 64, while linkages 515,520,530 and 535 remain in their original square configuration.

The various positions of unit 600 shown in FIGS. 65-67 demonstrate that unit 600 has three degrees of freedom, wherein three angles may be positioned independently of one another.

In FIG. 68 unit 600 is shown in an elongated position wherein linkages 510,515,520,525,530 and 535 all have identical angles between their respective links.

FIGS. 69 and 70 show two other positions of unit 600 wherein linkages 510,515,520,525,530 and 535 continue to have identical angles between their respective links.

FIG. 71 shows unit 600 in a further flattened position. FIG. 72 shows unit 600 as it approaches a fully flattened position.

FIG. 73 shows folding units 600,605,610,615,620,625, 630 and 635 in an exploded perspective view. FIG. 74 shows a folding assembly 650. Unit 635 is joined to units 600, 610 and 620 by fixed connections between end edges of their respective neighboring linkages. Similarly, each folding unit within assembly 650 is connected to other units by fixed connections between their end edges of neighboring linkages. FIGS. 75 and 76 show assembly 650 in successively further folded positions.

FIGS. 77,78,79 and 80 show assembly 650 in a series of different configurations.

FIG. 81 shows assembly 650 as it approached a fully flattened position.

FIG. 82 shows an exploded view of a three layers 710, 711 and 712 that may be laminated together to form a linkage. Layers 710 and 712 are each comprised of a multiplicity of polygonal shapes that have been cut from a rigid sheet of material. Layer 711 is cut from a sheet of flexible material and will provide a hinges for the linkage.

FIG. 83 shows a plan view of the assembled laminate 720 which will be folded into a linkage. Laminate 720 is comprised of a multiplicity of polygonal regions. Regions 713,714,715 and 716 are each comprised three layers: two rigid layers sandwiching an interior flexible layer. Region 721 is comprised of a single flexible layer, thereby forming a hinge between 714 and 715. Shaded regions 722 and 724 are comprised of a single rigid layer and will serve as pockets for later assembly. Regions 723 and 726 are comprised of comprised of a rigid layer and a flexible layer and are hingedly connected to regions 716 and 715 respectively and will serve as attachment flaps for later assembly.

FIG. 84 shows a perspective view of laminate 720 in a flat configuration. FIGS. 85 and 86 show 720 in successive folded positions as it is formed into a linkage. FIG. 87 shows 720 wherein pocket 722 and flap 723 have been fixedly joined together, forming a closed loop. Laminate linkage 720 forms a modular linkage that serves as a building block to create folding units under this invention.

FIG. 88 shows three modular linkages 720,730 and 740 in exploded view. Flap 747 is aligned with pocket 724. Likewise flap 725 is aligned with pocket 746. In a similar fashion flaps 727,736,734 and 745 are aligned with pockets 737, 726,744 and 735 respectively.

FIG. 89 shows linkages 720,730 and 740 having been joined together by making a fixed connection between flaps and pockets of the respective linkages as shown. After being joined together, linkages 720,730 and 740 have a hinged connection between them. It should be noted that these hinge connections are not created by the assembly process—they pre-exist as are part of the modular linkages. This ensures ease of assembly and precise alignment.

FIGS. 90 and 91 show reconfigurable unit 750 in two positions where linkages 720,730 and 740 have been further joined to three additional modular linkages.

FIG. 92 shows reconfigurable unit 800 which is comprised of six linkages 810,820,830,840,850 and 860. A motor 825 is attached to linkage 820, and has an aligned orientation along the hinge that connects linkage 820 to 830. The shaft of motor 825 is attached to linkage 830. Motor 825 thus serves as a controllable actuator for the relative angular position between linkages 820 and 830. In a similar fashion, motor 815 is attached to linkage 810 with its shaft attached to linkage 850, and has an aligned orientation along the hinge connecting linkages 810 and 850. Likewise, motor 845 is attached to linkage 840, with its shaft attached to linkage 860, and has an aligned orientation along the hinge connecting linkages 840 and 860. Motors 815, 825 and 845 control three angles, thus providing actuation for the three degrees of freedom of reconfigurable unit 800.

FIGS. 93,94,95 and 96 show unit 800 in various positions each specified by a unique combination of angles as controlled by motors 815, 825 and 845.

It should be noted that unit 800 may be programmably positioned by controlling three angles within the unit, utilizing various means of actuation, such as pneumatic or hydraulic devices. Further, various different combinations of hinges may be selected for control still providing the ability to programmably position a particular folding unit.

While there has been described what are at present considered to be the preferred embodiments of the present invention, it will be apparent to those skilled in the art that the embodiments described herein are by way of illustration and not of limitation. Various modifications of the disclosed embodiments, as well as alternative embodiments of the invention, will become apparent to persons skilled in the art upon reference to the description of the invention. Therefore, it is to be understood that various changes and modifications may be made in the embodiments disclosed herein without departing from the true spirit and scope of the present invention, as set forth in the appended claims, and it is contemplated that the appended claims will cover any such modifications or embodiments.

What is claimed is:

1. A reconfigurable foldable unit comprising:
a plurality of linkages, said linkages arranged together in order to define a central polyhedral design having a plurality of faces;
wherein each said linkage has a tubular geometric prism configuration and is formed by a plurality of planar links with opposed sides;
wherein one side of one planar link of each said linkage is pivotally connected to the other side of an adjacent planar link in order to define a plurality of hinges, with each said linkage being in the form of a closed loop;

wherein each said link of any of said linkages further has a first edge at one end that is not parallel to the opposed sides of said link, said link first edges of any one of said linkages lying in a common plane and together forming a linkage polygonal shape, said linkage polygonal shapes corresponding to and defining at least some of the faces of said polyhedral design;

wherein at least one of said link first edges of any one of said linkages is pivotally connected to one of said link first edges of another of said linkages in order to define a link to link hinge.

2. The reconfigurable foldable unit of claim 1, further including a plurality of polygonal shaped panels having a plurality of sides, said linkages and panels arranged together in order to define said central polyhedral design.

3. The reconfigurable foldable unit of claim 2, wherein said panels define said faces of said polyhedral design that are not defined by said linkage polygonal shapes.

4. The reconfigurable foldable unit of claim 1, wherein each said link of said linkages has opposed substantially parallel sides.

5. The reconfigurable foldable unit of claim 1, wherein each said linkage is formed by an even number of links.

6. The reconfigurable foldable unit of claim 1, wherein each said link of any of said linkages has said first edge substantially perpendicular to said link parallel sides.

7. The reconfigurable foldable unit of claim 2, wherein at least one of the link first edges of any one of said linkages is not pivotally connected to one of the link first edges of another of said linkages.

8. The reconfigurable foldable unit of claim 7, wherein said at least one of the link first edges is pivotally connected to one of said sides of one of said polygonal shaped panels in order to define a link to panel linear hinge.

9. The reconfigurable foldable unit of claim 1, wherein said plurality of linkages are modular in order to form foldable units of varying configuration.

10. The reconfigurable foldable unit of claim 1, wherein at least some of said hinges includes an actuation mechanism for selectively reconfiguring said foldable unit.

11. The reconfigurable foldable unit of claim 10, wherein said actuation mechanism is a motor.

12. A reconfigurable foldable assembly comprising at least two reconfigurable foldable units of claim 1 that are joined together.

13. The assembly of claim 12, wherein a first of said linkages of a first reconfigurable foldable unit is connected to a first of said linkages of a second reconfigurable foldable unit in order to form a first joined linkage.

14. The assembly of claim 13, wherein each link of any of said linkages has a second edge at the other end that is not parallel to said link parallel sides, said link second edges of any of said linkages lying in a common plane.

15. The assembly of claim 14, wherein one of said linkages of said first reconfigurable foldable unit is connected to one of said linkages of said second reconfigurable foldable unit by fixedly connecting the link second edges of said first reconfigurable foldable unit linkage to the link second edges of said second reconfigurable foldable unit linkage.

16. The assembly of claim 12, wherein a first of said linkages of a third reconfigurable foldable unit is connected to a first of said linkages of a fourth reconfigurable foldable unit in order to form a second joined linkage.

17. The assembly of claim 16, wherein the said first joined linkage maintains a parallel orientation to that of said second joined linkage.

* * * * *